US008921755B2

(12) United States Patent
Ricard et al.

(10) Patent No.: US 8,921,755 B2
(45) Date of Patent: Dec. 30, 2014

(54) DETECTION CIRCUIT WITH CORRELATED DOUBLE SAMPLING WITH IMPROVED ANTI-BLOOMING CIRCUIT

(75) Inventors: Nicolas Ricard, Coublevie (FR); Frederic Salvetti, Montbonnot (FR)

(73) Assignee: Societe Francaise de Detecteurs Infrarouges—Sofradir, Chatenay Malabry (FR)

(*) Notice: Subject to any disclaimer, the term of this patent is extended or adjusted under 35 U.S.C. 154(b) by 615 days.

(21) Appl. No.: 13/305,155

(22) Filed: Nov. 28, 2011

(65) Prior Publication Data
US 2012/0132789 A1 May 31, 2012

(30) Foreign Application Priority Data

Nov. 29, 2010 (FR) ..................... 10 04629

(51) Int. Cl.
*H03F 3/08* (2006.01)
*G01J 1/44* (2006.01)
*H04N 5/359* (2011.01)
*H04N 5/374* (2011.01)
*H04N 5/3745* (2011.01)

(52) U.S. Cl.
CPC ............. *H04N 5/3591* (2013.01); *H04N 5/374* (2013.01); *H04N 5/3745* (2013.01)
USPC ..................... 250/214 A; 250/214 C; 330/308

(58) Field of Classification Search
CPC ..... H04N 5/3591; H04N 5/374; H04N 5/357; H04N 5/3575; G01J 1/44; G01J 1/46; G01J 1/42; G01J 1/10; H03F 3/08; H03F 1/34; H01L 27/146
USPC ............ 250/214 A, 214 AG, 214 LA, 214 R, 250/214 C, 208.1; 327/514, 342, 345, 337, 327/363; 348/300, 301, 294, 297; 330/252, 330/254, 278, 282, 291, 308
See application file for complete search history.

(56) References Cited

U.S. PATENT DOCUMENTS

| 4,893,088 | A  | * | 1/1990  | Myers et al.  | 327/336   |
|-----------|----|---|---------|---------------|-----------|
| 5,448,056 | A  |   | 9/1995  | Tsuruta       |           |
| 6,342,694 | B1 | * | 1/2002  | Satoh         | 250/214 A |
| 7,132,638 | B2 | * | 11/2006 | Liu et al.    | 250/208.1 |
| 7,205,845 | B2 | * | 4/2007  | Harms et al.  | 330/308   |
| 7,598,479 | B2 | * | 10/2009 | Nogami et al. | 250/214 A |
| 8,274,334 | B2 | * | 9/2012  | Baud          | 330/308   |
| 2003/0034433 | A1 |   | 2/2003 | Fowler        |           |

* cited by examiner

*Primary Examiner* — Que T Le
*Assistant Examiner* — Jennifer Bennett
(74) *Attorney, Agent, or Firm* — Oliff PLC

(57) ABSTRACT

The detection circuit with correlated double sampling comprises two transimpedance amplifiers connected by means of a sampling capacitor. A photodiode is connected to the input of the first transimpedance amplifier. The circuit comprises an anti-blooming circuit connected between the input and output of the first transimpedance amplifier. The anti-blooming circuit comprises means for comparing the output voltage of the first transimpedance amplifier with a setpoint voltage defined by means of the output voltage of the second transimpedance amplifier. The means for comparing are connected to means for applying a feedback current to the input of the first transimpedance amplifier when the difference between the output voltage and the setpoint voltage reaches a limit value.

8 Claims, 5 Drawing Sheets

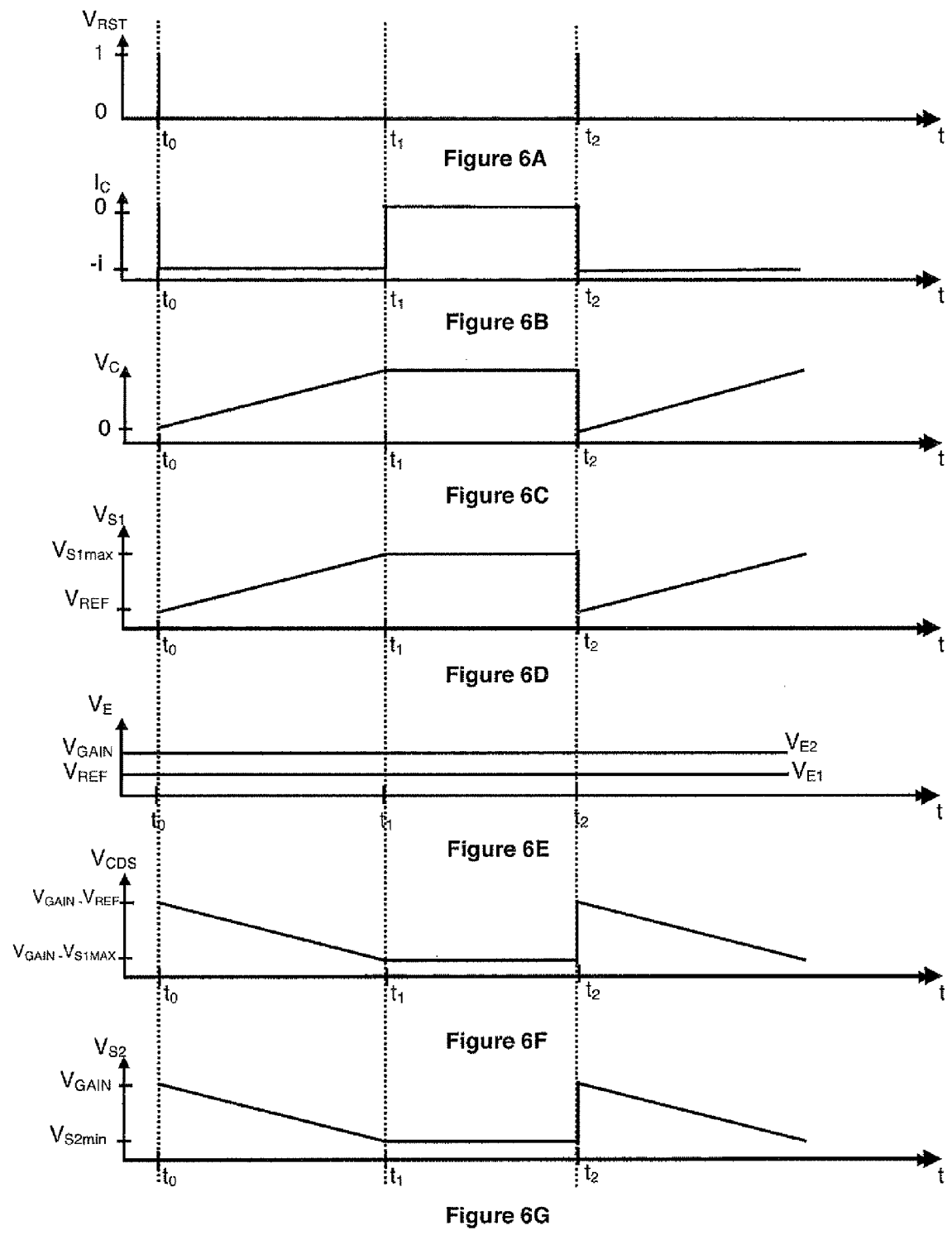

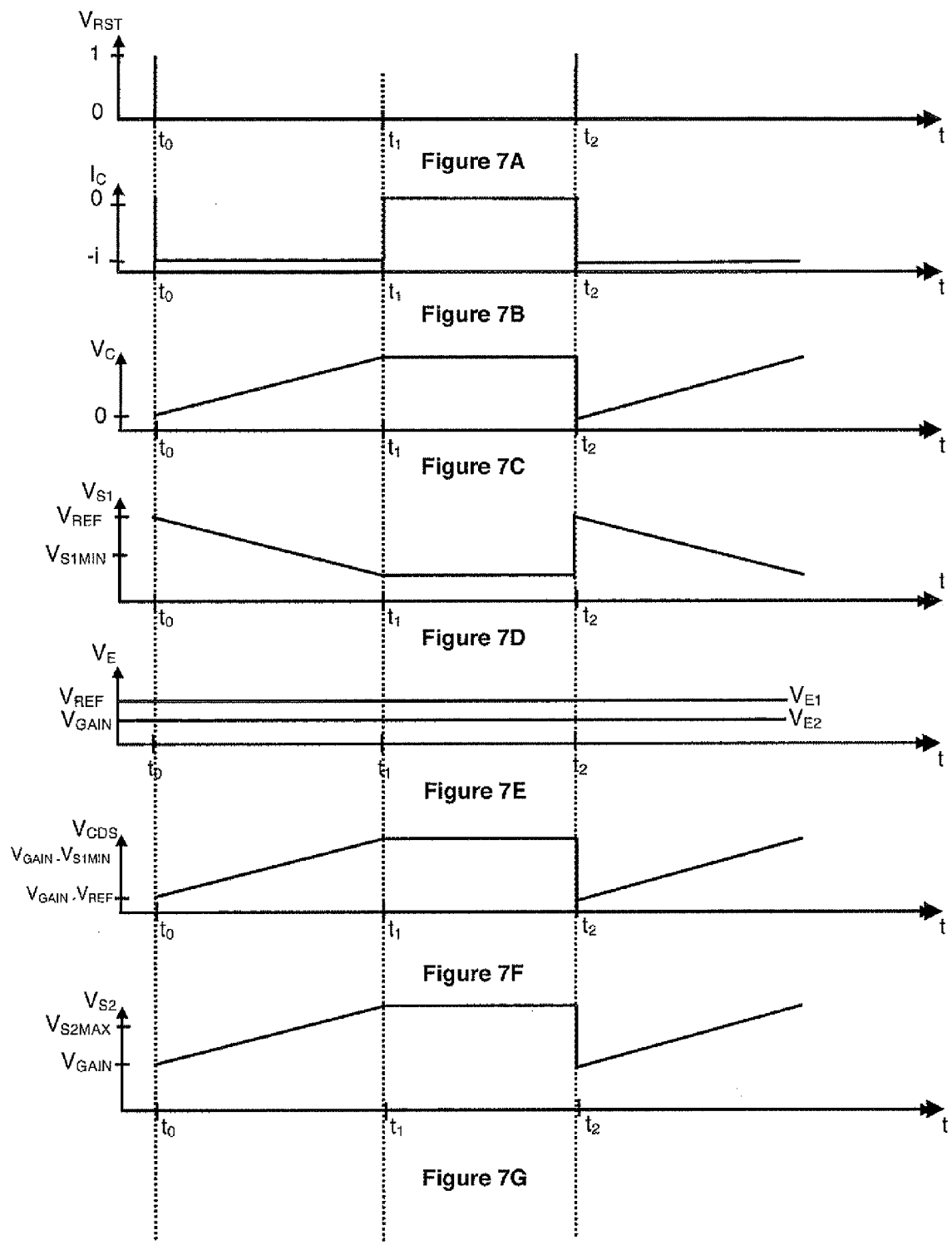

DETECTION CIRCUIT WITH CORRELATED DOUBLE SAMPLING WITH IMPROVED ANTI-BLOOMING CIRCUIT

BACKGROUND OF THE INVENTION

The invention relates to a detection circuit with correlated double sampling comprising:
- a first transimpedance amplifier,
- a photodiode connected to an input of the first transimpedance amplifier,
- a second transimpedance amplifier,
- a sampling capacitor connected between an output of the first transimpedance amplifier and an input of the second transimpedance amplifier.

The invention also relates to a method for reading the irradiation by a detection circuit.

STATE OF THE ART

As illustrated in FIG. 1, in conventional detection circuits, a reverse biased photodiode 1 delivers a current representative of an observed scene. The photodiode 1 delivers this current to a readout module 2 during a predefined period.

Readout module 2 comprises a first integrator device 3 which is formed by a capacitive transimpedance amplifier. The capacitive transimpedance amplifier comprises an amplifier 4 connected in negative feedback manner by an integration capacitor $C_{INT}$. The cathode of photodiode 1 is connected to a first input of amplifier 4 and a substrate voltage $V_{Sub}$ is applied to the anode of photodiode 1. So long as the voltage of the first input of amplifier 4 is higher than substrate voltage $V_{Sub}$, photodiode 1 is reverse biased and operates in expected manner.

In order to eliminate a part of the parasite noise originating from the input of the read circuit, the latter comprises a correlated double sampling function. Readout module 2 of the detection circuit thus comprises a second integrator module 5 associated with first integrator module 2. A sampling capacitor $C_{DS}$ connects the output of first integrator module 2 to the input of second integrator module 5.

Second integrator module 5 is a capacitive transimpedance amplifier which comprises a second amplifier 6 with an amplification capacitor $C_{AMP}$. Amplification capacitor $C_{AMP}$ is connected in negative feedback manner to the terminals of second amplifier 6.

The current emitted by photodiode 1 is integrated by integration capacitor $C_{INT}$ of first integrator module 2. First integrator module 2 delivers a voltage $V_{S1}$ on output which is representative of the lighting of the observed scene by means of integration capacitor $C_{INT}$.

This information is transmitted to second integrator module 5 by means of sampling capacitor $C_{DS}$. Second integrator module 5 delivers a voltage $V_{S2}$ on output which is, at the outcome, representative of the lighting of the scene observed by photodiode 1.

However, if photodiode 1 is exposed to a too intense light irradiation, the current which is integrated in integration capacitor $C_{INT}$ also becomes high. The voltage difference that exists at the terminals of capacitor $C_{INT}$ modifies voltage $V_{E1}$ of the first input of amplifier 4 and therefore the bias of photodiode 1. In the case where the current delivered by photodiode 1 is very high, the voltage difference at the terminals of photodiode 1 is modified so that the photodiode becomes depolarized. This depolarization lead to a modification, an increase of the photon collection surface in the adjacent photodiodes. Thus, when a photodiode is too intensely lighted, a blooming effect occurs on the adjacent photodiodes which deliver a current representative of a greater lighting than is the case in reality.

In the document US 2003/0034433, illustrated in FIG. 2, a readout module comprising a single integrator module is achieved with an anti-blooming transistor. An nMOS transistor 7 is connected between the first input and the output of amplifier 4.

The transistor 7 of nMOS type is connected in parallel to the terminals of capacitor 4. The object of this transistor 7 is to prevent depolarization of photodiode 1 by preventing the voltage $V_{E1}$ of the first input of amplifier 4 from dropping below a limit value. An anti-blooming voltage $V_{AB}$ is therefore applied to the gate electrode for transistor 7 to turn on before photodiode 1 is depolarized. Anti-blooming voltage $V_{AB}$ is chosen such that photodiode 1 is always reverse biased, i.e. it is not forward biased. Anti-blooming voltage $V_{AB}$ is defined with respect to voltage $V_{E1}$ of the first input of amplifier 3.

As photodiode 1 progressively draws current, amplifier 4 supplies this current through integration capacitor $C_{INT}$, while at the same time maintaining the first input of amplifier 4 at the voltage value imposed by the second input. This charging of integration capacitor $C_{INT}$ results in an increase of output voltage $V_{S1}$ of amplifier 4. From the moment the output voltage $V_{S1}$ reaches a limit value, the voltage $V_{E1}$ of the first input of amplifier 4 decreases. This decrease takes place until the voltage difference between the gate electrode at voltage $V_{AB}$ and the first input of amplifier 3 reaches the threshold voltage of transistor 7. Once this threshold voltage has been reached, transistor 7 turns on, the additional charges are evacuated and voltage $V_{E1}$ of the first input of amplifier 3 no longer changes. Thus, if voltage $V_{E1}$ of the first input reaches a certain predefined threshold, the nMOS transistor turns on and the additional charges are evacuated. Voltage $V_{E1}$ of the first input can therefore no longer vary beyond a limit voltage.

The circuit proposed in the document US 2003/0034433 provides an answer to the general problem of the blooming phenomena in theoretical manner, but this circuit is not satisfactory as the constraints that weigh on industrial use of this architecture are too numerous and make this circuit unusable from an industrial point of view.

OBJECT OF THE INVENTION

The object of the invention is to provide detection circuit with correlated double sampling which tends to correct blooming phenomena and which is easy to implement, while at the same time ensuring reliable and repeatable production for industrial integration.

The device according to the invention is characterized in that it comprises an anti-blooming circuit connected between the input and output of the first transimpedance amplifier, the anti-blooming circuit comprising:
- a circuitry configured to compare the output voltage of the first transimpedance amplifier with a setpoint voltage defined from the output voltage of the second transimpedance amplifier, and
- a circuitry configured to apply a negative feedback current to the input of the first transimpedance amplifier when the difference between the output voltage and the setpoint voltage reaches a limit value.

It is a further object of the invention to provide a read method that is easy to implement, while at the same time ensuring reliable and repeatable production for industrial integration.

The method of the invention is characterized in that it comprises the following steps:

generating a current from a reverse-biased photodiode to an input of a first transimpedance amplifier, an output of the first transimpedance amplifier being connected to an input of a second transimpedance amplifier by a sampling capacitor, each transimpedance amplifier having an input and an output connected by a passive element, comparing the output voltage of the first transimpedance amplifier with a setpoint voltage defined from the output voltage of the second transimpedance amplifier, generating a negative feedback current on the input of the first transimpedance amplifier when the difference between the output voltage and the setpoint voltage reaches a threshold value so as to limit the output voltage of the first transimpedance amplifier.

BRIEF DESCRIPTION OF THE DRAWINGS

Other advantages and features will become more clearly apparent from the following description of particular embodiments of the invention, given for non-restrictive example purposes only and represented in the appended drawings in which:

FIGS. 6A to 6G and 7A to 7G represent the variations of voltages or currents for characteristic elements of the circuits illustrated in FIGS. 4 and 5.

DESCRIPTION OF A PREFERRED EMBODIMENT OF THE INVENTION

Figure 1:
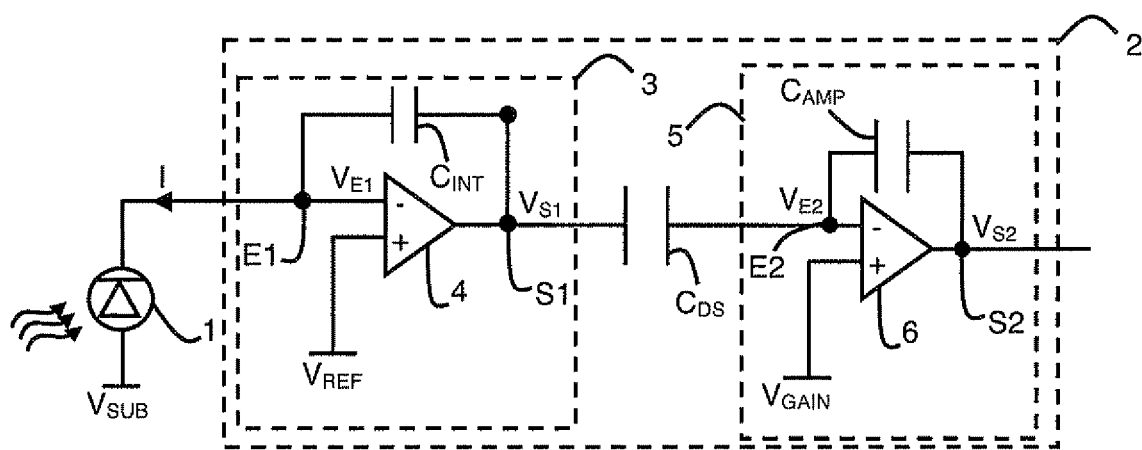
FIG. 1 represents a detection circuit with correlated double sampling according to the prior art, in schematic manner.
Figure 2:
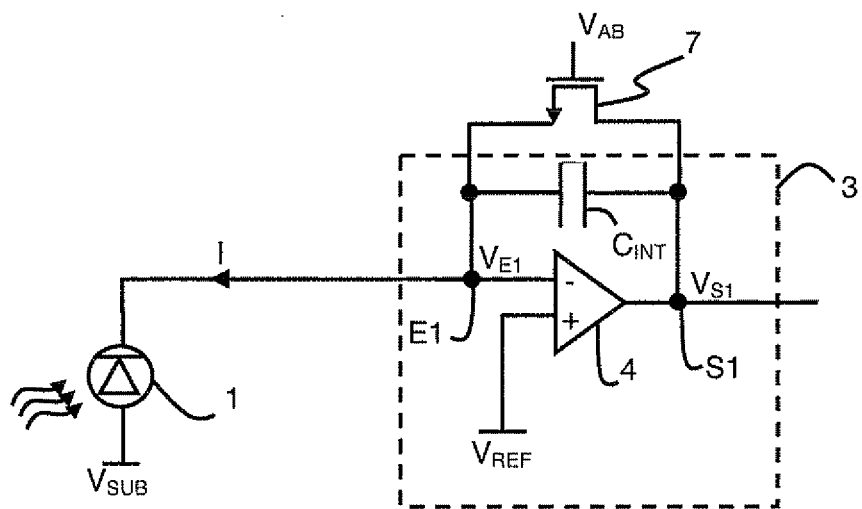
FIG. 2 represents a detection circuit with an anti-blooming module according to the prior art, in schematic manner.
Figure 3:
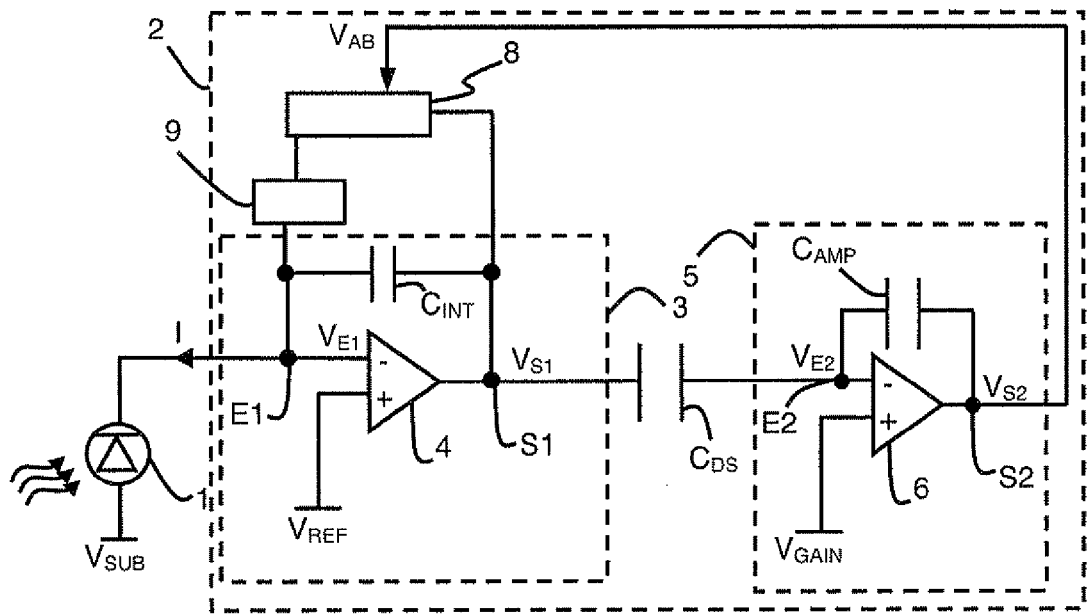
FIG. 3 represents a first embodiment of a detection circuit with correlated double sampling and an anti-blooming module, in schematic manner.
Figure 4:
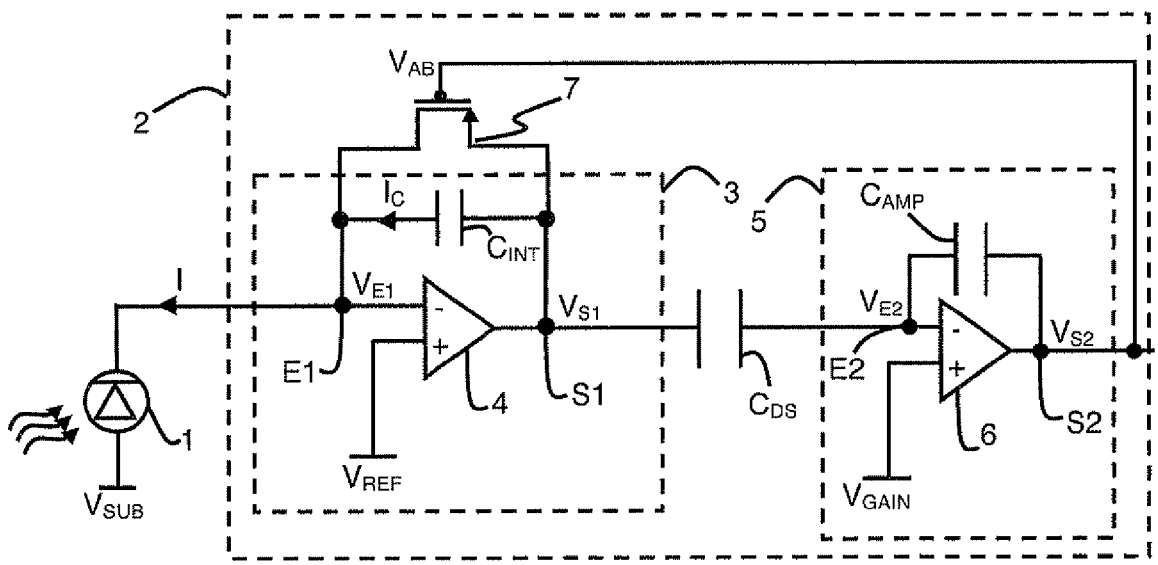
FIGS. 4 and 5 represent more particular embodiments of a detection circuit with correlated double sampling and an anti-blooming module, in schematic manner.
Figure 5:
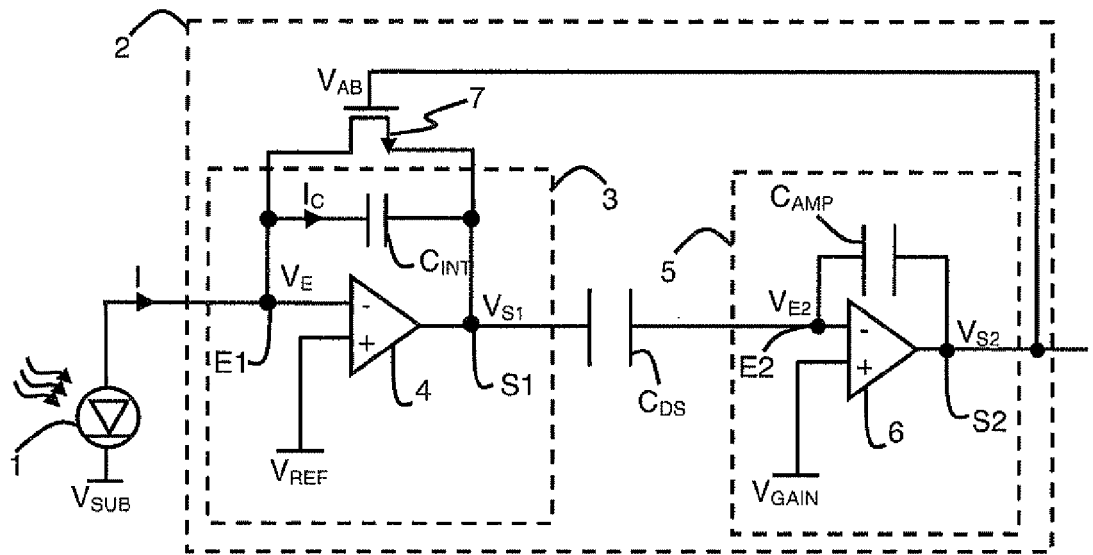

As illustrated in FIGS. 3 to 5, the detection circuit comprises a photodiode 1 connected to a readout module 2.

In the detection circuit illustrated in FIGS. 3 to 5, readout module 2 comprises a first transimpedance amplifier 3 and a second transimpedance amplifier 5. The transimpedance amplifiers comprise an amplifier, typically an operational amplifier, and a passive element connected in negative feedback manner, here a capacitor. The capacitor is connected between the first input and the output of the amplifier.

First capacitive transimpedance amplifier 3 is part of or forms a first integrator module of the detection circuit. Second capacitive transimpedance amplifier 5 is part of or forms a second integrator module of the detection circuit.

First 3 and second 5 capacitive transimpedance amplifiers are of opposite types. There is one amplifier whose differential pair on input of the circuit is achieved by means of nMOS transistors, and one amplifier whose differential pair on input of the circuit is achieved by means of pMOS transistors. This differentiation of the amplifiers is linked to the variation of the voltages during operation. In conventional manner, when the photodetector draws current, the differential pair is formed by transistors of nMOS type. When the photodetector injects current, the differential pair is formed by transistors of pMOS type.

In first capacitive transimpedance amplifier 3, a capacitor is connected in negative feedback manner to a first amplifier 4 and is called integration capacitor $C_{INT}$. In second capacitive transimpedance amplifier 5, a capacitor is connected in negative feedback manner to a second amplifier 6 and is called amplification capacitor $C_{AMP}$.

A first electric node $E_1$ is defined by the connection of photodiode 1 with integration capacitor $C_{INT}$ and the first input of first amplifier 4. A second electric node $S_1$ is defined by the connection of integration capacitor $C_{INT}$, of sampling capacitor $C_{DS}$ and of the output of first amplifier 4. First electric node $E_1$ represents the input of first capacitive transimpedance amplifier 3 and second electric node $S_1$ represents the output of first capacitive transimpedance amplifier 3.

A third electric node $E_2$ is defined by the connection of sampling capacitor $C_{DS}$ with amplification capacitor $C_{AMP}$ and the first input of second amplifier 6. A fourth electric node $S_2$ is defined by the connection of amplification capacitor $C_{AMP}$ and of the output of second amplifier 6. Third electric node $E_2$ represents the input of second transimpedance amplifier 5 and fourth electric node $S_2$ represents the output of second transimpedance amplifier 5.

Photodiode 1 is connected to input $E_1$ of first transimpedance amplifier 3. A reference voltage $V_{REF}$ is applied on a second input of first amplifier 4 by a circuitry configured to apply reference voltage $V_{REF}$. The voltage of the first terminal of photodiode 1, i.e. voltage $V_{E1}$ of first electric node E1, is imposed by the voltage applied to the second input of amplifier 4.

A substrate voltage $V_{Sub}$ is applied to a second terminal of photodiode 1. Photodiode 1 is therefore biased between substrate voltage $V_{Sub}$ and the voltage $V_{E1}$ of the input of first amplifier 4, i.e. between substrate voltage $V_{Sub}$ and reference voltage $V_{REF}$. Photodiode 1 is reverse biased to supply a current representative of the lighting of the observed scene, and substrate voltage $V_{Sub}$ and voltage $V_{E1}$ of the first input of first amplifier 4 are chosen accordingly.

Output terminal $S_1$ of first transimpedance amplifier 3 is coupled to one of the terminals of sampling capacitor $C_{DS}$. The other terminal of sampling capacitor $C_{DS}$ is coupled to a first input terminal $E_2$ of second trans-impedance amplifier 5. First transimpedance amplifier 3 and second trans-impedance amplifier 5 are thus coupled by means of sampling capacitor $C_{DS}$.

A gain voltage $V_{GAIN}$ is applied on a second input of second transimpedance amplifier 5 by a circuitry configured to apply a gain voltage $V_{GAIN}$. The voltage of the second terminal of sampling capacitor $C_{DS}$, i.e. voltage $V_{E2}$ of the third electric node E2, is imposed by the voltage applied to the second input of amplifier 6. Sampling capacitor $C_{DS}$ is biased between $V_{S1}$ and $V_{E2}$ and therefore between $V_{REF}$ and $V_{GAIN}$ when the capacitors are discharged.

The detection circuit also comprises an anti-blooming circuit connected between input $E_1$ and output $S_1$ of first transimpedance amplifier 3. The anti-blooming circuit is therefore connected to the terminals of integration capacitor $C_{INT}$.

In general manner, the anti-blooming circuit comprises a comparator 8 configured to compare output voltage $V_{S1}$ of first transimpedance amplifier 3 with a setpoint voltage $V_{AB}$. It also comprises a device 9 for applying a negative feedback current, for example a current source, on first input $E_1$ of first transimpedance amplifier 3 when the difference between output voltage $V_{S1}$ of first amplifier 4 and setpoint voltage $V_{AB}$ reaches a threshold, i.e. a limit value that is not able to be exceeded.

As illustrated in FIG. 3, the anti-blooming circuit can comprise a polarization terminal which enables setpoint voltage $V_{AB}$ to be defined. This polarization terminal is distinct from the input terminals of first amplifier 3. Setpoint voltage $V_{AB}$ is defined by means of the voltage delivered on output $S_2$ of second transimpedance amplifier 5. In a preferred embodiment, setpoint voltage $V_{AB}$ corresponds to voltage $V_{S2}$ delivered by output terminal $S_2$ of second transimpedance amplifier 5. As setpoint voltage $V_{AB}$ is defined by means of output voltage $V_{S2}$ of second transimpedance amplifier 5, the detection circuit performs comparison of output voltage $V_{S1}$ of first amplifier 3 with output voltage $V_{S2}$ of second amplifier 5.

In a particularly advantageous embodiment illustrated in FIGS. 4 and 5, the anti-blooming circuit comprises a field effect transistor 7 connected between input $E_1$ and output $S_1$ of first capacitive transimpedance amplifier 3. Transistor 7 is therefore connected in parallel to the terminals of integration capacitor $C_{INT}$. Transistor 7 is connected to amplifier 3 in negative feedback. Setpoint voltage $V_{AB}$ is applied to the gate electrode of field effect transistor 7. Anti-blooming voltage $V_{AB}$ acts as setpoint voltage with respect to output voltage $V_{S1}$ and enables it to define when transistor 7 is off or on.

As illustrated in FIG. 4, in a first particular embodiment, transistor 7 of the anti-blooming circuit is of pMOS type. Substrate voltage $V_{Sub}$ is applied to the anode of photodiode 1 whereas the cathode is connected to input $E_1$ of first capacitive transimpedance amplifier 3. Transistor 7 is therefore connected via its drain terminal to the cathode of photodiode 1, typically at the level of first input $E_1$ of first capacitive transimpedance amplifier 3. Photodiode 1 being reverse biased, voltage $V_{E1}$ at first node $E_1$ is higher than substrate voltage $V_{Sub}$.

In this embodiment, the on or off state of pMOS transistor 7 is defined with respect to the voltage difference which exists between the gate electrode and output $S_1$ of first amplifier 3. Anti-blooming voltage $V_{AB}$ applied on the gate electrode of pMOS transistor 7 is compared with output $S_1$ of capacitive transimpedance amplifier 3 and no longer with the first input as in the case of the nMOS transistor of the prior art.

In this way, only one condition is necessary to prevent the blooming phenomenon. Transistor 7 simply has to turn on when the value of the voltage on the output of amplifier 3 reaches a limit value, a maximum output value $V_{Smax}$. This condition is represented in equation 1 for a pMOS transistor.

$$V_{AB} < V_{Smax} - |V_{th}| \qquad (1)$$

When the difference between output voltage $V_{S1}$ and setpoint voltage $V_{AB}$ reaches a threshold value, a negative feedback current is generated on input $E_1$ of first transimpedance amplifier 3 so as to limit output voltage $V_{S1}$ of first transimpedance amplifier 3. The negative feedback current corresponds to evacuation of the excess charges at the terminals of integration capacitor $C_{INT}$.

Transistor 7 is turned off so long as voltage $V_{AB}$ applied on the gate electrode of transistor 7 is higher than output voltage $V_{S1}$ of first amplifier 4 from which the absolute value of threshold voltage $V_{th}$ of transistor 7 is subtracted. In other words, transistor 7 is turned off so long as the difference between setpoint voltage $V_{AB}$ and output voltage $V_{S1}$ is lower than the threshold voltage of transistor 7, as is represented in equation 1.

In the detection circuit, the current emitted by photodiode 1 is stored by integration capacitor $C_{INT}$, which results in the occurrence of a voltage difference at the terminals of capacitor $C_{INT}$. Variation of the voltage difference at the terminals of capacitor $C_{INT}$ results in a variation of voltage $V_{S1}$ which itself causes a variation of voltage $V_{S2}$.

When output voltage $V_{S2}$ of second transimpedance amplifier 5 varies, setpoint voltage $V_{AB}$ also varies until the difference between setpoint value $V_{AB}$ and the output voltage of the first amplifier reaches a threshold. At this moment, transistor 7 turns on and a negative feedback current is created which prevents input voltage $V_{E1}$ and output voltage $V_{S1}$ of first amplifier 3 from exceeding the threshold values. There is therefore a continuous variation of the voltages applied on the source and gate of transistor 7 until the voltage difference between the source and gate results in transistor 7 switching to on state.

Output voltage $V_{S1}$ of the first amplifier and output voltage $V_{S2}$ of the second amplifier vary until they reach their limit value. These two limit values correspond to the moment when the anti-blooming module is triggered, i.e. to the moment when the voltage difference between the gate and source is equal to the threshold voltage of transistor 7.

In the case where the output of second transimpedance amplifier 5 is directly connected to the comparator 8, here to the gate of transistor 7, a direct comparison is made between voltage $V_{S2}$ and voltage $V_{S1}$.

In the case where the anti-blooming module comprises a pMOS field effect transistor connected in parallel to the terminals of the integration capacitor, the transistor is in off state so long as voltage $V_{S2}$ on output of second transimpedance amplifier 5 is higher than voltage $V_{S1}$ on output of the first transimpedance amplifier less the absolute value of the threshold voltage. There is no current flow. The current delivered by photodetector 1 charges integration capacitor $C_{INT}$ without a part of the current being shunted off by transistor 7.

In general manner, if the anti-blooming module comprises a field effect transistor connected in parallel to the terminals of integration capacitor $C_{INT}$, comparison of the voltage difference between the gate and source is made with respect to the threshold voltage to switch the transistor to the on state.

In so far as output voltage $V_{S1}$ varies between reference voltage $V_{REF}$ and the saturation voltage of amplifier 4, a maximum accessible output voltage $V_{Smax}$ that is comprised between these two voltages simply has to be defined, preferably a maximum output voltage close to the saturation voltage of the amplifier, in order to have a large dynamic range.

In this way, transistor 7 turns on when output voltage $V_{S1}$ is equal to the maximum authorized voltage $V_{S1max}$, i.e. to a voltage close to the saturation voltage. Depolarization of photodiode 1 and saturation of the amplifier are thus prevented. As switching of transistor 7 from off state to on state is performed with respect to output voltage $V_{S1}$, there are always charges accumulated in integration capacitor $C_{INT}$ when transistor 7 changes from the off state to the on state.

A similar adjustment is made on voltage $V_{S2}$ on output of second amplifier 6. In this manner, the device takes advantage of the largest possible range on voltages $V_{S1}$ and $V_{S2}$ before the difference between voltages $V_{S2}$ and $V_{S1}$ makes transistor 7 switch to on state. The values of reference voltage $V_{REF}$, gain voltage $V_{GAIN}$ and capacitor voltages $C_{INT}$, $C_{DS}$ and $C_{AMP}$ are chosen so as to adjust the operating conditions and according to other requirements of the circuit.

The closer the maximum output voltage $V_{S1max}$ is to the saturation voltage, the greater the quantity of charges accumulated in integration capacitor $C_{INT}$ before switching takes place. Thus, with a maximum output voltage substantially equal to the saturation voltage, the greatest possible range in use of integration capacitor $C_{INT}$ is obtained. Advantageously, output voltage $V_{S2MIN}$ is chosen close to the saturation voltage by means of amplification capacitor $C_{AMP}$.

Switching of transistor 7 from the off state to the on state being defined with respect to the output voltage, the criticality of the variations of threshold voltage $V_{th}$ that are linked to the fabrication method is lessened. Transistor 7 simply has to switch to an on state at the latest when output voltage $V_{S1}$ reaches the saturation voltage of the amplifier.

Switching of transistor 7 between the on state and off state also depends on output voltage $V_{S2}$ of second transimpedance amplifier 5. Switching of transistor 7 between the on state and off state is therefore dependent on the value of sampling capacitor $C_{DS}$, on the value of amplification capacitor $C_{AMP}$ and on gain voltage $V_{GAIN}$. The values of these different parameters are therefore chosen such as to preferably obtain switching of transistor 7 before output voltages $V_{S1}$ and $V_{S2}$ reach their saturation value. The difference between reference voltage $V_{REF}$ and gain voltage $V_{GAIN}$ is such that in the absence of charges in the integration capacitor, transistor 7 is in open switch state.

The sensitivity of the variation of voltage $V_{S2}$ according to the charge of integration capacitor $C_{INT}$ is linked to the values of capacitors $C_{INT}$, $C_{DS}$ and $C_{AMP}$.

The difference between voltage $V_{REF}$ and voltage $V_{GAIN}$ is preferably at least equal to the mean threshold voltage of the transistors involved in the structure. This enables the operating range of the device to be increased to prevent saturation of second amplifier 6. The threshold voltage of transistor 7 is representative of the threshold voltages of the transistors used in amplifiers 4 and 6. As progressive charging of integration capacitor $C_{INT}$ takes place, output voltages $V_{S1}$ and $V_{S2}$ vary in opposite manner, i.e. $V_{S2}$ decreases when $V_{S1}$ increases and vice-versa.

Advantageously, when the cathode of photodetector 1 is connected to first amplifier 4, gain voltage $V_{GAIN}$ is higher than reference voltage $V_{REF}$. When the anode of photodetector 1 is connected to first amplifier 4, reference voltage $V_{REF}$ is higher than gain voltage $V_{GAIN}$.

In another embodiment illustrated in FIG. 5, the detection circuit comprises an opposite assembly to that of FIG. 4. The photodiode is connected in the other direction, transistor 7 is now an nMOS transistor and the distribution of the voltages has been reversed. Comparator 8 is connected to the anode of the photodiode. For an nMOS transistor, the transistor is in an off state so long as the difference between the voltage applied on the gate (setpoint voltage $V_{AB}$) and the source voltage (the voltage coming from the output of second amplifier 6) is higher than the threshold voltage of the transistor.

Operation of the circuit illustrated in FIGS. 3 and 4 can be described schematically in the following manner in FIGS. 6A to 6G. At a time $t_0$, a reset circuit performs short-circuiting of the terminals of integration capacitor $C_{INT}$ which therefore becomes discharged. FIG. 6A illustrates operation of the reset circuit in logic manner. Reset of integration capacitor $C_{INT}$ is performed by means of a pulse (duration in high state 1) at a reset voltage. The same is the case with amplification capacitor $C_{AMP}$.

For example purposes, reset voltage $V_{RST}$ is applied to a second transistor (not shown) which is connected in parallel to the terminals of integration capacitor $C_{INT}$ which then turns on. Voltage difference $V_{CINT}$ at the terminals of integration capacitor $C_{INT}$ is then zero (FIG. 6C). Photodiode 1 is reverse biased between substrate voltage $V_{Sub}$ (applied to the anode in FIGS. 3 and 4) and voltage $V_{E1}$ of first input $E_1$ of first capacitive transimpedance amplifier 3, typically reference voltage $V_{REF}$, applied on the second input of first amplifier 4 (FIG. 6E).

At time $t_0$, voltage $V_{E1}$ of the first input of first capacitive transimpedance amplifier 3 is therefore equal to reference voltage $V_{REF}$ (FIG. 6E) and photodiode 1 is biased between $V_{REF}$ and $V_{Sub}$, i.e. to voltage $V_{REF}-V_{Sub}$. Voltage $V_{S1}$ on output of the first capacitive transimpedance amplifier is equal to $V_{REF}$ (FIG. 6D). Voltage $V_{S1}$ is applied on one of the terminals of sampling capacitor $C_{DS}$, here voltage $V_{REF}$.

Input voltage $V_{E2}$ of second amplifier 6 is applied on the second terminal of sampling capacitor $C_{DS}$. Input voltage $V_{E2}$ corresponds to gain voltage $V_{GAIN}$ which is applied on the second input terminal of second amplifier 6 (FIG. 6E). Sampling capacitor $C_{DS}$ is biased between $V_{GAIN}$ and $V_{REF}$ (FIG. 6F). Amplification capacitor $C_{AMP}$ is discharged and second capacitive transimpedance amplifier 5 presents gain voltage $V_{GAIN}$ on output.

If the output of second transimpedance amplifier 6 is connected directly to the gate of transistor 7, the latter compares the two output voltages of the transimpedance amplifiers. Gain voltage $V_{GAIN}$ here being higher than reference voltage $V_{REF}$, transistor 7 is in an off state. In an alternative embodiment, a voltage representative of output voltage $V_{S2}$ is applied on the gate electrode of transistor 7 which slightly modifies the value of the comparison, the result being identical.

Between time $t_0$ and time $t_1$, photodiode 1 delivers a current I representative of the observed scene, here in schematic manner a constant current. The charges composing this current are stored in integration capacitor $C_{INT}$ and result in a voltage difference $V_{CINT}$ at the terminals of integration capacitor $C_{INT}$. This voltage difference increases progressively with charging of integration capacitor $C_{INT}$. Voltage $V_{S1}$ and the voltage at the terminals $C_{INT}$ increase progressively with charging of capacitor $C_{INT}$, as illustrated in FIGS. 6C and 6D.

In normal operation, first transimpedance amplifier 3 forces voltage $V_{E1}$ of the first input to be equal to the voltage of the second input, here reference voltage $V_{REF}$. Between times $t_0$ and $t_1$, voltage $V_{E1}$ of the first input and therefore the voltage difference at the terminals of photodiode 1 are constant. This results in variation of output voltage $V_{S1}$ of the first capacitive transimpedance amplifier, output voltage $V_{S1}$ increasing progressively from reference voltage $V_{REF}$ with charging of integration capacitor $C_{INT}$.

Only output voltage $V_{S1}$ varies. Voltage $V_{S1}$ varies with charging of capacitor $C_{INT}$ and the voltage on the other terminal of sampling capacitor $C_{DS}$ is fixed by second amplifier 6 at gain voltage $V_{GAIN}$. As gain voltage $V_{GAIN}$ is higher than reference voltage $V_{REF}$, a decrease of the voltage difference at the terminals of sampling capacitor $C_{DS}$ occurs progressively with charging of integration capacitor $C_{INT}$.

As output voltage $V_{S1}$ of the first amplifier progressively increases, the voltage difference at the terminals of sampling capacitor $C_{DS}$ and at the terminals of amplification capacitor $C_{AMP}$ vary (FIGS. 6F and 6G). This results in a decrease of output voltage $V_{S2}$ of second transimpedance amplifier 5 from a gain voltage $V_{GAIN}$ and therefore a decrease of the voltage applied on the gate of transistor 7. Output voltages $V_{S1}$ and $V_{S2}$ of the two transimpedance amplifiers vary in opposite directions. In spite of the variation of voltage $V_{S2}$, transistor 7 remains in off state. During this period, there is no current flowing through transistor 7.

At time $t_1$, the difference between output voltage $V_{S2}$ of the second integrator module and output voltage $V_{S1}$ of the first integrator module reaches a limit value (here the threshold voltage of transistor 7), which results in the appearance of a feedback current between input $E_1$ and output $S_1$ of the first amplifier. At time $t_1$, transistor 7 turns on which enables flow of the feedback current or evacuation of the excess charges.

Output voltage $V_{S1}$ of first transimpedance amplifier 3 reaches the maximum value $V_{S1max}$. Output voltage $V_{S2}$ of second transimpedance amplifier 5 reaches the minimum value $V_{S2min}$. Transistor 7 turns on as output voltage $V_{S2}$ of second transimpedance amplifier 5 is equal to output voltage $V_{S1}$ of first transimpedance amplifier 3 with threshold voltage $V_{th}$ of transistor 7 (negative voltage in the case of a pMOS), i.e. when $V_{S1MAX} = V_{S2MIN} + |V_{th}|$.

As from this moment, transistor 7 is on and the current now flows from photodiode 1 through transistor 7. The additional charges sent by photodiode 1 are not stored by integration capacitor $C_{INT}$. The voltage difference at the terminals of capacitors $C_{INT}$ and $C_{AMP}$ is therefore constant as from time $t_1$. The current of photodiode 1 corresponds to the sum of the current flowing through transistor 7 and of the current of integration capacitor $C_{INT}$.

Transistor 7 is triggered before output voltage $V_{S1}$ of first amplifier 3 and advantageously before output voltage $V_{S2}$ of second amplifier 5 reach their saturation voltage (FIGS. 6D and 6G), i.e. the maximum or minimum value which the amplifier can deliver on its output.

Thus, as soon as transistor 7 turns on, there is no variation of $V_{S1}$ which prevents any variation of voltage $V_{E1}$ of the first input of amplifier 3 (FIG. 6E) and depolarization of photodiode 1 is prevented.

Integration capacitor $C_{INT}$ is then discharged at the end of the measuring period at time $t_2$ by means of the reset circuit. The circuit then reverts to the conditions of time $t_0$. The same is the case for the amplification capacitor.

As illustrated in FIG. 5, in a second embodiment, transistor 7 of the anti-blooming circuit is an nMOS transistor connected to the anode of photodiode 1 by means of the first input of the capacitive transimpedance amplifier. Compared with the previous embodiment, the biases and types of conductivity of the transistors and of the photodetectors are reversed.

The variations of the voltages and currents flowing in the circuit is represented in FIGS. 7A to 7G which correspond substantially to FIGS. 6A to 6G in the opposite direction.

In this particular embodiment, output voltage $V_{S1}$ of first amplifier 4 varies from reference voltage $V_{REF}$ which is imposed on the second input of amplifier 4 to minimum output voltage $V_{S1MIN}$ (FIG. 7D). In this embodiment, output voltage $V_{S1}$ decreases with charging of integration capacitor $C_{INT}$ (FIG. 7D). Output voltage $V_{S2}$ of second transimpedance amplifier 5 increases with charging of amplification capacitor $C_{AMP}$ to reach maximum output voltage $V_{S2MAX}$ (FIG. 7G). Gain voltage $V_{GAIN}$ is lower than reference voltage $V_{REF}$ (FIG. 7E). The voltage difference at the terminals of sampling capacitor $C_{DS}$ increases progressively with charging of integration capacitor $C_{INT}$.

In general manner, photodiode 1 delivers a current representative of the observed scene on input E1 of first transimpedance amplifier 3. This current on input E1 leads to the appearance of a voltage difference between input terminal $V_{E1}$ and output terminal $V_{S1}$ of first transimpedance amplifier 3 as these two terminals are connected by a passive element such as a capacitor. This voltage difference at the terminals of the passive element results in the appearance of a voltage difference at the terminals of the equivalent passive element of second transimpedance amplifier 6. There is therefore a variation of the output voltage of each amplifier and the difference between these two voltages is used to trigger the anti-blooming module.

Output voltage $V_{S2}$ of second amplifier 6 varies with charging of amplification capacitor $C_{AMP}$. Output voltage $V_{S1}$ is compared with a setpoint voltage $V_{AB}$ (coming from voltage $V_{S2}$) via means for comparing 8. When the difference between output voltage $V_{S1}$ and setpoint voltage $V_{AB}$ (or the opposite depending on the embodiment) reaches a threshold value, a feedback current is generated on input $E_1$ of transimpedance amplifier 3. This feedback current prevents the voltage difference between input terminal $E_1$ and output terminal $S_1$ of transimpedance amplifier 3 from increasing.

The fact that setpoint voltage $V_{AB}$ is defined by means of output voltage $V_{S2}$ of second transimpedance amplifier 5 avoids having to introduce an additional polarization line. The detection circuit is therefore particularly compact. Moreover, if setpoint voltage $V_{AB}$ corresponds to the output voltage of second transimpedance amplifier 6, the compactness of the circuit is increased.

The case where the anti-blooming circuit comprises a transistor connected between the first input and the output of the capacitive transimpedance amplifier is particularly advantageous, as it enables a circuit which is compact to be obtained. The rest of the circuit can be transferred to an area where the integration density is a less critical parameter.

In a particularly advantageous embodiment, sampling capacitor $C_{DS}$ is achieved by means of a capacitor having a variable capacitance according to the bias applied to its terminals. This modulation of the electric capacitance enables the triggering sensitivity of the anti-blooming module to be adjusted.

In advantageous manner, the sampling capacitor is off Metal-Oxide-Semiconductor type. In even more advantageous manner, the sampling capacitor is an nMOS capacitor when the anti-blooming circuit is connected to the cathode of the photodetector, i.e. in a particular case when transistor 7 of the anti-blooming circuit is of pMOS type according to the embodiments illustrated in FIGS. 3 to 5. In the embodiments of FIGS. 3 and 4, if capacitor $C_{DS}$ is of nMOS type, the gate electrode is connected to second amplifier 6 and the substrate electrode is connected to the output of the first amplifier. If capacitor $C_{DS}$ is of pMOS type, the connections are reversed, the gate electrode is connected to the output of the first amplifier and the substrate electrode is connected to second amplifier 6. In the embodiment of FIG. 5, if capacitor $C_{DS}$ is of nMOS type, the gate electrode is connected to the output of the first amplifier and the substrate electrode is connected to second amplifier 6. The connections are reversed if capacitor $C_{DS}$ is of pMOS type.

Output $S_1$ of first amplifier 4 is connected to the gate of the MOS capacitor and input $E_2$ of second amplifier 6 is connected to the substrate of the MOS capacitor with a p-doped semi-conductor.

When sampling capacitor $C_{DS}$ is of Metal-Oxide-Semiconductor type, the capacitance value varies according to the voltage difference applied to its terminals. However in a capacitor of MOS type, this variation takes place until the difference between the gate electrode and the substrate is equal to the threshold voltage of the transistor. Once this value has been reached, the electric capacitance value no longer changes.

As the value of the electric capacitance of sampling capacitor $C_{DS}$ progresses, the voltage difference at the terminals of amplification capacitor $C_{AMP}$ and output voltage $V_{S2}$ also vary.

In this way, with a sampling capacitor of MOS type, the variation rate of output voltage $V_{S2}$, from a threshold, according to charging of integration capacitor $C_{INT}$ changes. This embodiment enables more flexible triggering of the anti-blooming module to be obtained by reducing the variation rate of the voltage difference between $V_{S1}$ and $V_{S2}$ according to charging of integration capacitor $C_{INT}$. The variation of the capacitance value takes place during switching from accumulation regime to inversion regime.

Figure 8:
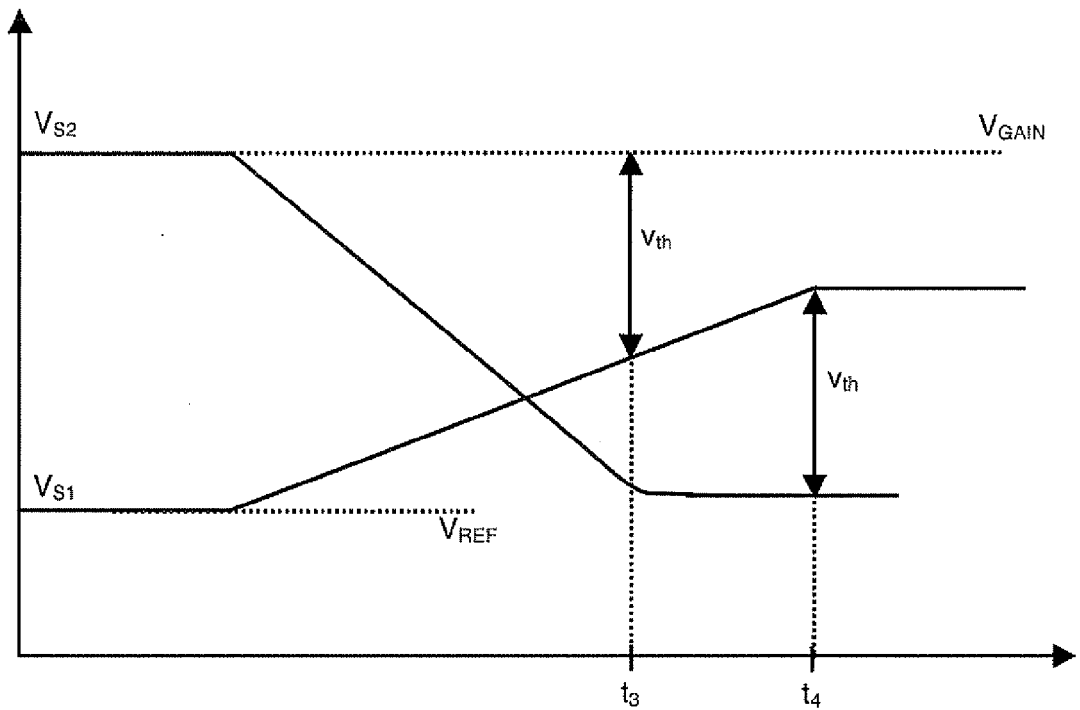
FIG. 8 represents the voltage variation at the terminals of the anti-blooming module according to the embodiment illustrated in FIG. 6.

As illustrated in FIG. 8, at a time $t_3$, when the voltage difference at the terminals of sampling capacitor $C_{DS}$, i.e. the difference between $V_{GAIN}$ and $V_{S1}$ is equal to the threshold voltage of the capacitor, the capacitance is annulled and the gain of second amplifier 6 (linked to the ratio between $C_{DS}$ and $C_{AMP}$) therefore tends to be annulled. Voltage $V_{S2}$ stops varying and remains constant at the value of $V_{S2}$ present when capacitance $C_{DS}$ is annulled. As the value of voltage $V_{S1}$ continue to progress, the voltage difference between $V_{S1}$ and $V_{S2}$ continues to increase until threshold voltage $V_{th}$ of transistor 7 is reached at time $t_4$.

A similar operation can be obtained in the embodiment illustrated in FIG. 5 in which the sampling capacitor is of pMOS type, i.e. with an n-doped semi-conductor.

The operating frequency is preferably lower than 50 MHz.

The invention claimed is:

1. A detection circuit with correlated double sampling comprising:
   a first capacitive transimpedance amplifier,
   a photodiode connected to an input of the first transimpedance amplifier,
   a second capacitive transimpedance amplifier,
   a sampling capacitor connected between an output of the first transimpedance amplifier and an input of the second transimpedance amplifier,
   an anti-blooming circuit connected between the input and output of the first transimpedance amplifier, the anti-blooming circuit comprising:
      a comparator configured to compare the output voltage of the first transimpedance amplifier with a setpoint voltage defined from the output voltage of the second transimpedance amplifier, and
      a circuitry configured to apply a feedback current to the input of the first transimpedance amplifier when the difference between the output voltage and the setpoint voltage reaches a limit value.

2. The circuit according to claim 1, wherein the sampling capacitor presents a variable capacitance according to the voltage difference present between the output of the first transimpedance amplifier and the input of the second transimpedance amplifier.

3. The circuit according to claim 2, wherein the sampling capacitor is made from a MOS capacitor.

4. The circuit according to claim 1, wherein the anti-blooming circuit comprises:
   a p-type MOS transistor with a first terminal connected to the input of the first transimpedance amplifier and connected to a cathode of the photodiode and a second terminal connected to the output of the first transimpedance amplifier,
   a device for applying the setpoint voltage on a control electrode of the transistor,
   a device for applying a reference voltage to the first amplifier and a gain voltage to the second amplifier, the reference voltage being lower than the gain voltage.

5. The circuit according to claim 1, wherein the anti-blooming circuit comprises:
   an n-type MOS transistor with a first terminal connected to the input of the first transimpedance amplifier and connected to an anode of the photodiode and a second terminal connected to the output of the first transimpedance amplifier,
   a device for applying the setpoint voltage on a control electrode of the transistor,
   a device for applying a reference voltage to the first amplifier and a gain voltage to the second amplifier, the reference voltage being higher than the gain voltage.

6. The circuit according to claim 1, wherein the setpoint voltage is equal to the output voltage of the second transimpedance amplifier.

7. A method for reading a detection circuit, comprising the following steps:
   generating a current from a reverse-biased photodiode to an input of a first transimpedance amplifier, an output of the first transimpedance amplifier being connected to an input of a second transimpedance amplifier by a sampling capacitor, each transimpedance amplifier having an input and an output connected by a passive element,
   comparing the output voltage of the first transimpedance amplifier with a setpoint voltage defined from the output voltage of the second transimpedance amplifier,
   generating a feedback current to the input of the first transimpedance amplifier when the difference between the output voltage and the setpoint voltage reaches a threshold value so as to limit the output voltage of the first transimpedance amplifier.

8. The method according to claim 7, wherein generation of the feedback current is caused by turn-on of a transistor connecting the input to the output of the first operational amplifier.

* * * * *